(12) United States Patent
Niedert et al.

(10) Patent No.: US 11,066,081 B2
(45) Date of Patent: Jul. 20, 2021

(54) METHODS AND APPARATUS TO MODIFY VEHICLE FUNCTION BASED ON LOADING CONDITIONS

(71) Applicant: Ford Global Technologies, LLC, Dearborn, MI (US)

(72) Inventors: Andrew Niedert, Farmington Hills, MI (US); Peter Simeon Lazarevski, Dearborn, MI (US); Anton Rogness, Dearborn, MI (US); Elliott Pearson, Shelby Township, MI (US); Joshua Rajasingh, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 16/191,051

(22) Filed: Nov. 14, 2018

(65) Prior Publication Data

US 2019/0337529 A1     Nov. 7, 2019

Related U.S. Application Data

(60) Provisional application No. 62/665,343, filed on May 1, 2018.

(51) Int. Cl.
*B60W 50/12* (2012.01)
*B60R 25/10* (2013.01)

(52) U.S. Cl.
CPC ............ *B60W 50/12* (2013.01); *B60R 25/10* (2013.01); *B60R 2025/1016* (2013.01); *B60W 2530/10* (2013.01)

(58) Field of Classification Search
CPC .. B60W 50/12; B60W 2530/10; B60W 40/13; B60R 25/10; B60R 2025/1016
See application file for complete search history.

(56) References Cited

U.S. PATENT DOCUMENTS

| 5,912,439 | A  | * | 6/1999  | Eran    | B60G 17/019 |
|-----------|----|---|---------|---------|-------------|
|           |    |   |         |         | 177/136     |
| 6,560,561 | B1 |   | 5/2003  | Foster et al. | |
| 6,721,680 | B2 |   | 4/2004  | Sorrells et al. | |
| 7,855,662 | B2 |   | 12/2010 | Yano    | |
| 9,776,624 | B1 | * | 10/2017 | Leone   | B60K 6/40 |
| 9,870,653 | B1 | * | 1/2018  | Fritz   | B60D 1/62 |
| 9,956,965 | B1 | * | 5/2018  | Hall    | B60W 50/14 |
| 10,252,727| B1 | * | 4/2019  | Braun   | B60W 50/12 |
| 2010/0076673 | A1 |   | 3/2010 | Saloka  | |
| 2013/0024090 | A1 | * | 1/2013 | Minase  | B60W 50/10 |
|           |    |   |         |         | 701/102    |
| 2014/0358376 | A1 | * | 12/2014 | Phelan  | B60W 10/04 |
|           |    |   |         |         | 701/41     |

(Continued)

FOREIGN PATENT DOCUMENTS

CN   206948508   1/2018
WO   2009158338  12/2009

*Primary Examiner* — Angelina Shudy
(74) *Attorney, Agent, or Firm* — Ray Coppiellie; Hanley, Flight & Zimmerman, LLC

(57) ABSTRACT

Methods, apparatus, systems and articles of manufacture are disclosed to modify vehicle function based on loading conditions. An example apparatus includes a vehicle load condition manager programmed to modify a feature of a vehicle when a load condition of the vehicle satisfies a threshold, wherein at least one of the feature or the threshold is based upon a profile of a user of the vehicle.

20 Claims, 9 Drawing Sheets

(56) References Cited

U.S. PATENT DOCUMENTS

| | | | |
|---|---|---|---|
| 2015/0191178 A1* | 7/2015 | Roy | H04W 4/027 |
| | | | 701/36 |
| 2015/0233719 A1* | 8/2015 | Cudak | B60W 50/12 |
| | | | 701/23 |
| 2016/0231165 A1 | 8/2016 | Fredrickson | |
| 2016/0318521 A1* | 11/2016 | Nothacker | B60W 50/12 |
| 2017/0113607 A1* | 4/2017 | Corrales Salgado | |
| | | | G01G 19/021 |
| 2017/0200336 A1 | 7/2017 | Schmidt | |
| 2018/0010491 A1* | 1/2018 | Yamahata | B60K 6/383 |
| 2018/0194357 A1* | 7/2018 | Hall | B60W 50/14 |
| 2018/0215394 A1* | 8/2018 | Trageser | B60P 3/1033 |
| 2018/0265076 A1* | 9/2018 | Hall | B60W 10/18 |
| 2019/0225230 A1* | 7/2019 | Bullock | G01G 23/18 |
| 2020/0055471 A1* | 2/2020 | Niedert | B60K 35/00 |
| 2020/0156630 A1* | 5/2020 | Schmidt | B60W 30/09 |
| 2020/0198422 A1* | 6/2020 | Niedert | B60D 1/248 |
| 2020/0207294 A1* | 7/2020 | Niedert | B60K 35/00 |
| 2020/0317087 A1* | 10/2020 | Brinkmann | H01M 10/633 |

* cited by examiner

METHODS AND APPARATUS TO MODIFY VEHICLE FUNCTION BASED ON LOADING CONDITIONS

RELATED APPLICATIONS

This patent claims the benefit of U.S. Provisional Patent Application No. 62/665,343, filed May 1, 2018, entitled "Methods and Apparatus to Modify Vehicle Function Based on Loading Conditions." U.S. Provisional Patent Application No. 62/665,343 is hereby incorporated by reference herein in its entirety.

FIELD OF THE DISCLOSURE

This disclosure relates generally to vehicles and, more particularly, to methods and apparatus to modify vehicle function based on loading conditions.

BACKGROUND

Misuse of a vehicle, either by intentional or unintentional means, can degrade the reliability of the misused vehicle. In some examples, the likelihood of vehicle misuse may be increased when a non-owner (e.g., a child, a spouse, an employee, etc.) of the vehicle is operating the vehicle due to at least one of the non-owner being less knowledgeable regarding the limitations of the vehicle and/or the non-owner being less concerned about the durability of the vehicle.

One such example of improper use is overloading (e.g., placing too much weight in) the vehicle. For example, overloading of the vehicle by weight (e.g., too many passengers in the vehicle, too much weight in the trunk/bed of the vehicle, too large a trailer towed by the vehicle, etc.) can occur with privately owned vehicles (e.g., a car owned by a single individual) as well as fleet owned vehicles (e.g., a car owned by a car rental service, delivery service, etc.) and can significantly degrade the reliability of the vehicle.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Misuse of a vehicle, either by intentional or unintentional means, can degrade the reliability of the misused vehicle. In some examples, the likelihood of vehicle misuse may be increased when a non-owner (e.g., a child, a spouse, an employee, etc.) of the vehicle is operating the vehicle.

One such example of improper use is overloading (e.g., placing too much weight in) the vehicle. For example, overloading of the vehicle by weight (e.g., too many passengers in the vehicle, too much weight in the trunk/bed of the vehicle, too large a trailer towed by the vehicle, etc.) can occur with privately owned vehicles (e.g., a car owned by a single individual) as well as fleet owned vehicles (e.g., a car owned by a car rental service, delivery service, etc.) and can significantly degrade the reliability of the vehicle.

Additionally, vehicles have been increasingly implemented with digital technology including identification of a user (e.g., driver) of a vehicle by way of personalized vehicle key fobs (e.g., a key fob with an identifier communication circuit, a specific key blade pattern, etc.), a wireless connection to a wireless device associated with the user, and/or one or more presence sensors. Vehicles have also been implemented with sensors to measure loads on one or more portions of a vehicle in addition to communication options to allow a wireless device to wirelessly interface with the vehicle.

Examples disclosed herein modify vehicle function based on loading conditions. More specifically, the examples allow for the generation of user profiles for specific users (e.g., drivers) of a vehicle, identified by a key fob, wireless device, and/or other sensor, wherein the user profiles can be used to set various vehicle function modifications and loading condition limits for different users of the vehicle.

As will be discussed in greater detail below in accordance with the teachings of this disclosure, the vehicle load condition manager can have various configurations that may depend on a type of a vehicle and/or trailer coupled to the vehicle. In examples disclosed herein, these configurations can be changed or altered to ensure the vehicle load condition manager properly diagnoses an overload condition of the vehicle and responds correctly (e.g., limit speed, disable ignition, etc.) to the overload condition.

Figure 1A:
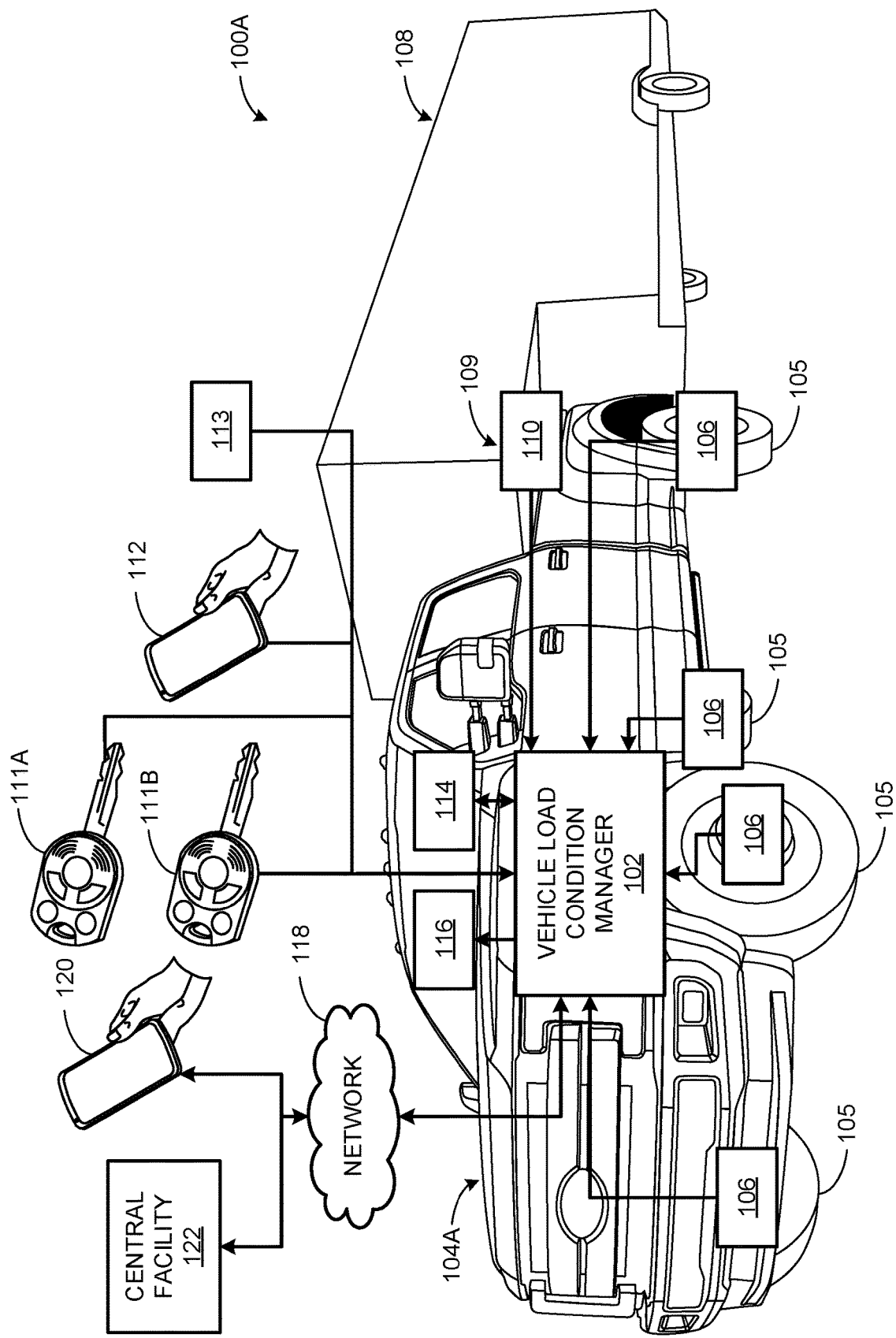
FIG. 1A illustrates an example vehicle and an example trailer coupled to the vehicle, the vehicle including a vehicle load condition manager by which the examples disclosed herein can be implemented.
Figure 2:
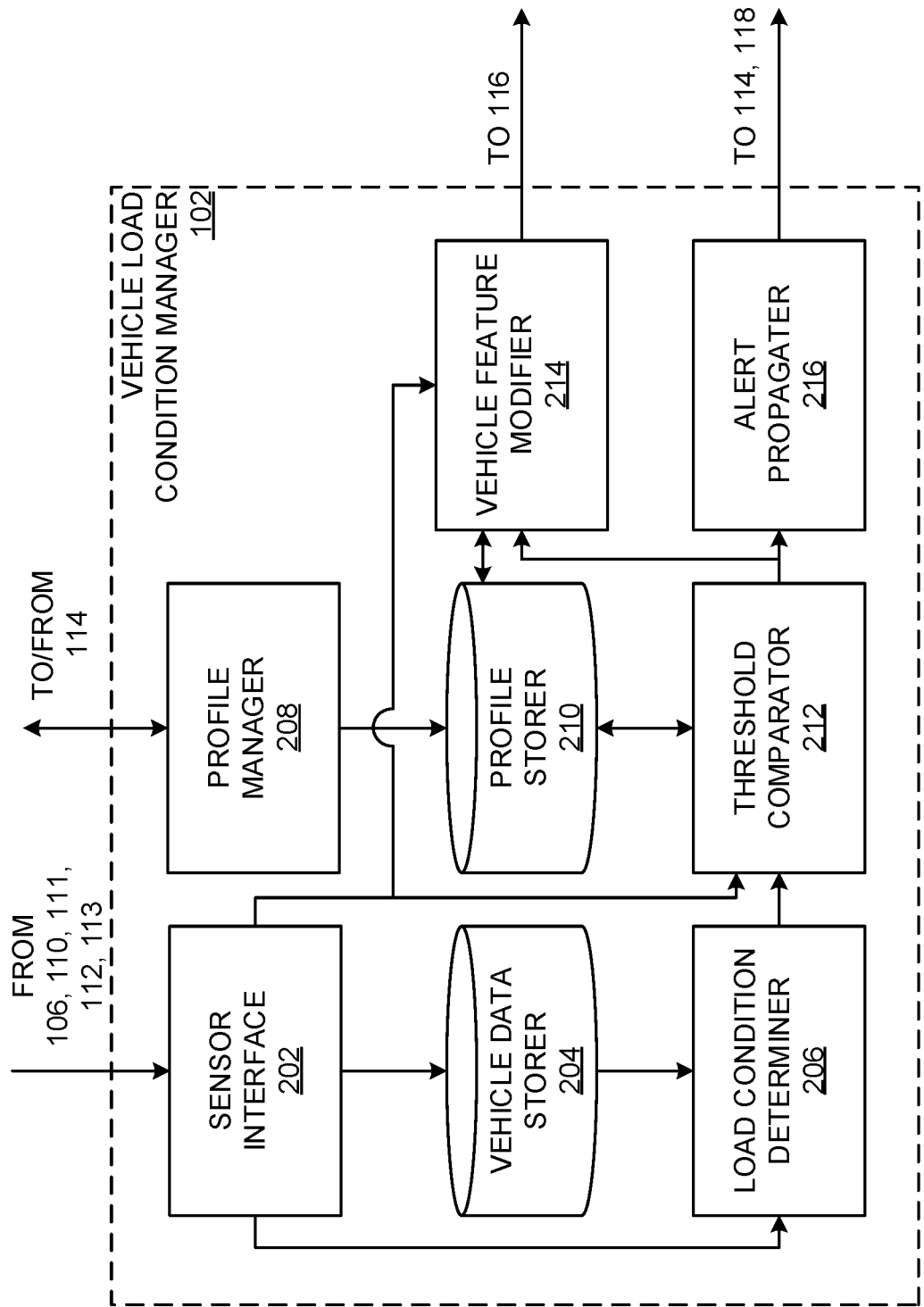
FIG. 2 is a block diagram further detailing the vehicle load condition manager of FIGS. 1A and 1B by which the examples disclosed herein can be implemented.

Turning to FIG. 1A, an example environment of use 100A of an example vehicle load condition manager 102, described further in conjunction with FIG. 2, includes a vehicle 104A. The vehicle 104A implements or otherwise includes the vehicle load condition manager 102 to determine one or more loading conditions on the vehicle 104A and to modify one or more features of the vehicle 104A when one of the loading conditions exceed a threshold.

The vehicle 104A further includes one or more wheel and suspension assemblies 105. In the illustrated example of FIG. 1, the vehicle 104A has four wheel and suspension assemblies 105. Additionally, one or more of the wheel and suspension assemblies 105 may include a weight sensor 106. In the illustrated example of FIG. 1A, each of the wheel and suspension assemblies 105 includes a respective weight sensor 106. In some examples, the weight sensors 106 are ride height sensors, which measure suspension compression (e.g., the suspension is compressed by 8 mm, 13 inches, etc.), from which loading conditions of the vehicle 104A can be inferred (e.g., via a correlation of deflection of suspension to weight using a spring constant (stiffness) of the suspension).

Additionally or alternatively, other weight sensors 106 (e.g., load cells, accelerometers, strain gauges, etc.) and/or metrics (e.g., powertrain/engine performance, etc.) can be used to calculate the loading conditions of the vehicle 104A. In some examples, loading conditions of the vehicle 104A calculated from data acquired via the weight sensors 106 can include at least load of a front axle of the vehicle 104A, load of a rear axle of the vehicle 104A, total load of the vehicle 104A, etc.

In some examples, the weight of the vehicle 104A and the contents thereof may be less than a capacity (e.g., a gross vehicle weight rating (GVWR) defined as the weight of the vehicle 104A and the contents thereof) of the vehicle 104A. Alternatively, the weight of the vehicle 104A and the contents thereof may be greater than a GVWR of the vehicle 104A. For example, if the GVWR of the vehicle 104A is 5,000 lbs., the vehicle 104A and the contents thereof can be any weight less than or equal to 5,000 lbs. and greater than the curb weight (e.g., weight of the vehicle 104A when unloaded) or any weight greater than or equal to 5,000 lbs. (e.g., 5,500 lbs., 6,000 lbs., etc.), the latter resulting in an overload condition. In some examples, the overload condition may be undesirable to an owner of the vehicle 104A. Additionally, the weight of the vehicle 104A and the contents thereof can vary with time. For example, if the vehicle 104A is used to transport multiple individuals, the weight of the vehicle 104A and the contents thereof may decrease or increase after an individual is dropped off or picked up, respectively.

In the illustrated example of FIG. 1A, the vehicle 104A is further capable of towing a trailer 108 coupled to the vehicle 104A by a trailer hitch 109. The trailer 108 and the contents thereof can be any weight, which can be measured by a trailer weight sensor 110. The trailer weight sensor 110, in some examples, can be integrated into the trailer hitch 109. For example, the trailer weight sensor 110 is a force sensor (e.g., a magnetoelastic force sensor, a load cell, a strain gauge, an accelerometer, etc.) capable of measuring forces and/or moments at the trailer hitch 109 coupling the trailer 108 to the vehicle 104A, the forces corresponding to one or more loading conditions (e.g., total load (weight of the trailer), tongue load (downward force on the trailer hitch), etc.) of the trailer 108.

In some examples, the weight of the trailer 108 and the contents thereof may be less than a towing capacity of the vehicle 104A. Alternatively, the weight of the trailer 108 and the contents thereof may be greater than a towing capacity of the vehicle 104A. For example, if the towing capacity of the vehicle 104A is 10,000 lbs., the trailer 108 and the contents thereof can be any weight less than or equal to 10,000 lbs. (e.g., 9,000 lbs., 3,000 lbs., etc.) or any weight greater than or equal to 10,000 lbs. (e.g., 11,000 lbs., 13,000 lbs., etc.), the latter resulting in an overload condition. In some examples, the overload condition may be undesirable to an owner of the vehicle 104A. Additionally, the weight of the trailer 108 and the contents thereof can vary with time. For example, if the vehicle 104A is used to deliver goods, the weight of the trailer 108 and the contents thereof may decrease after a delivery is complete.

The example environment of use 100A further includes at least one of a first key fob 111A or second key fob 111B, a first wireless device 112, and a presence sensor 113 used to identify a user (e.g., a driver) of the vehicle 104A. In some examples, each of the key fobs 111A, 111B is associated with a specific driver (e.g., a child, a spouse, an employee, etc.) of the vehicle 104A. For example, the first key fob 111A is associated with a child of an owner of the vehicle 104A and includes an identifier of the child and the second key fob 111B is associated with a spouse of an owner of the vehicle 104A and includes an identifier of the spouse. In some examples, the key fob(s) 111A, 111B communicate an identifier of the user to the vehicle load condition manager 102 via a wireless connection (e.g., a Bluetooth connection) when the key fob(s) 111A, 111B are proximate (e.g., in a cabin of) the vehicle 104A. Additionally or alternatively, the key fob(s) 111A, 111B communicate the identifier of the user to the vehicle load condition manager 102 via unique profile features (e.g., shape, cut, etc.) in a key blade of the key fob(s) 111A, 111B.

Additionally or alternatively, the first wireless device 112 is associated with (e.g., via an identifier and/or account tied to the first wireless device 112) a specific driver of the vehicle 104A. The first wireless device 112 can communicate with the vehicle load condition manager 102 by at least one of a wired (for example, connected to an entertainment device of the vehicle 104A via a universal serial bus (USB) connection, etc.) or a wireless (for example, Ethernet connection, a Bluetooth connection, a Wi-Fi connection, etc.) connection and, in some examples, distributes an identifier of the user of the vehicle 104A to the vehicle load condition manager 102 via the connection when the first wireless device 112 is proximate (e.g., in or near a cabin of) the vehicle 104A.

The example vehicle 104A further includes an example display 114. An example interface for output on the display 114 is described further in conjunction with FIGS. 3A-3B. In some examples, the display 114 is capable of notifying a user of the vehicle 104A to parameters, data, and/or alerts from the vehicle load condition manager 102. For example, the display 114 can notify the user of the vehicle 104A to an overload condition. In such examples, the display 114 can further describe actions the user can take to eliminate the overload condition.

Additionally or alternatively, a user profile can be viewed on the display 114 and the display 114 is further capable of receiving inputs to generate and/or modify one or more of the user profiles stored in the vehicle load condition manager 102. The display 114 may be any device capable of providing a notification to the user of the vehicle 104A. For example, the display 114 may be a visual display capable of visually displaying parameters, data, and/or alerts. Additionally or alternatively, the display 114 may include an audio system capable of audibly reciting parameters, data, and/or alerts.

The example vehicle 104A further includes an example performance controller 116 to enable modification and/or disablement of one or more features of the vehicle 104A. In some examples, the performance controller 116 is an ignition interlock that is capable of preventing an engine of the vehicle 104A from being started. This prevention of starting the engine of the vehicle 104A can be accomplished by a signal sent via a CAN (Controller Area Network) bus to at least one of an engine control module or a body control module included in the vehicle 104A.

Additionally or alternatively, the performance controller 116 is a shift interlock that is capable of limiting the gears into which the vehicle 104A can be shifted. For example, the performance controller 116 can prevent the vehicle 104A from leaving the parking gear. Additionally or alternatively, the performance controller 116 can prevent the vehicle 104A from shifting to any gear greater than a predetermined gear (e.g., the performance controller 116 can prevent shifting to any gear above $2^{nd}$ gear, thereby disabling $3^{rd}$ gear, $4^{th}$ gear, etc.). Additionally or alternatively, the performance controller 116 is a speed limiter that is capable of limiting an output speed of the vehicle 104A. For example, the performance controller 116 can limit the speed of the vehicle 104A to a predetermined value based upon a speed limit (e.g., 25 miles per hour, 65 miles per hour, etc.), to a predetermined maximum value (e.g., 32 miles per hours, 73 miles per hour, etc.), or to any other specified speed.

In the example environment of use 100A, the vehicle load condition manager 102 is further connected to an example network 118. For example, the network 118 of the illustrated example of FIG. 1A is the Internet. However, the network 118 may be implemented using any suitable wired and/or wireless network(s) including, for example, one or more data buses, one or more Local Area Networks (LANs), one or more wireless LANs, one or more cellular networks, one or more private networks, one or more public networks, etc. The network 118 enables the example vehicle load condition manager 102 to be in communication with at least one of a second wireless device 120 and a central facility 122. As used herein, the phrase "in communication," including variances thereof, encompasses direct communication and/or indirect communication through one or more intermediary components and does not require direct physical (e.g., wired) communication and/or constant communication, but rather includes selective communication at periodic or aperiodic intervals, as well as one-time events.

The second wireless device 120 (in some examples, used by the owner and/or manager of the vehicle 104A), is in communication with the vehicle load condition manager 102 via the network 118 and can receive an alert associated with an overload condition of the vehicle 104A. In such examples, the alert can additionally indicate the user (e.g., driver) of the vehicle 104A at the time of the overload condition. Additionally or alternatively, the second wireless device 120 can receive an input to modify one or more performance features of the vehicle (e.g., beyond the pre-existing profile) and distribute the input to the vehicle load condition manager 102 via the network 118.

The central facility 122, in communication with the vehicle load condition manager 102 via the network 118, can store one or more alerts, loading conditions, and/or overloading conditions received from the vehicle load condition manager 102. In some examples, the alerts, loading conditions, and/or overloading conditions received are associated with a user (e.g., a driver) of the vehicle 104A.

Figure 1B:
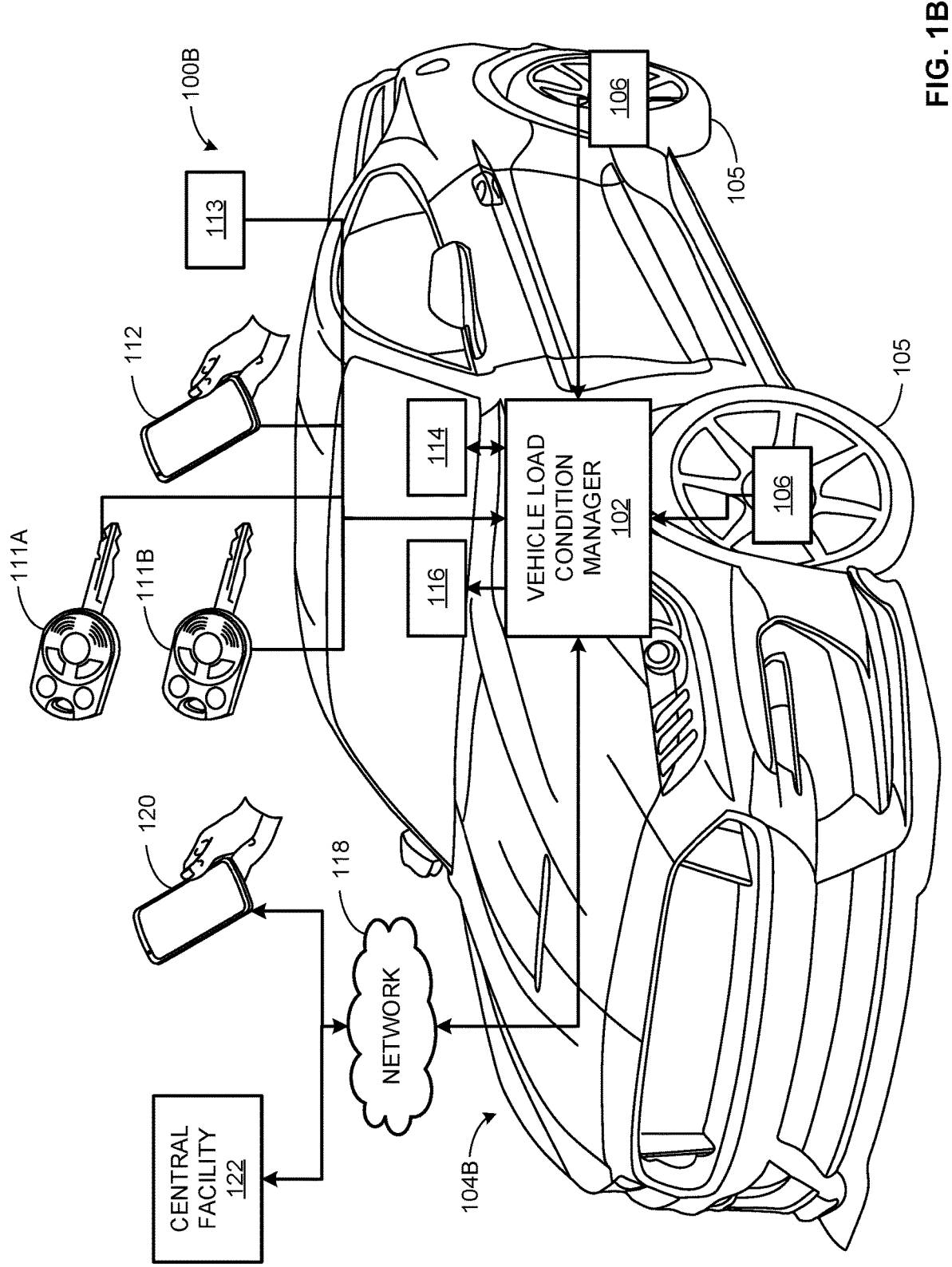
FIG. 1B illustrates another example vehicle including the vehicle load condition manager by which the examples disclosed herein can be implemented.

In FIG. 1B, an example environment of use 100B of the example vehicle load condition manager 102 includes a vehicle 104B. The vehicle 104B is similar to the vehicle 104A, but is not towing a trailer such as the trailer 108. The vehicle 104B further implements or otherwise includes the vehicle load condition manager 102 to determine one or more loading conditions on the vehicle 104B and modify one or more features of the vehicle 104B when one of the loading conditions exceeds a threshold.

FIG. 2 is a block diagram of an example implementation 200 of the example vehicle load condition manager 102 of FIGS. 1A and 1B. The vehicle load condition manager 102 can, in some examples such as the illustrated example of FIG. 2, include an example sensor interface 202, an example vehicle data storer 204, and example load condition determiner 206, an example profile manager 208, an example profile storer 210, an example threshold comparator 212, an example vehicle feature modifier 214, and an example alert propagater 216.

The sensor interface 202, included in or otherwise implemented by the vehicle load condition manager 102, is capable of receiving data from at least one of the weight sensor(s) 106, the trailer weight sensor 110, the key fob(s) 111A, 111B, the first wireless device 112, and/or the presence sensor 113. The sensor interface 202 is further capable of distributing received data (e.g., a sensor input) to at least one of the vehicle data storer 204, the load condition determiner 206, the threshold comparator 212, and/or the vehicle feature modifier 214. For example, the sensor interface 202 may distribute data from at least one of the weight sensor(s) 106, the trailer weight sensor 110, the key fob(s) 111A, 111B, the first wireless device 112, and the presence sensor 113 to the vehicle data storer 204, data from at least one of the weight sensor(s) 106, and the trailer weight sensor 110 to the load condition determiner 206, data from at least one of the key fob(s) 111A, 111B, the first wireless device 112, and the presence sensor 113 to the threshold comparator 212 and data from at least one of the key fob(s) 111A, 111B, the first wireless device 112, and the presence sensor 113 to the vehicle feature modifier 214.

The vehicle data storer 204, included in or otherwise implemented by the vehicle load condition manager 102, is capable of storing weight data of one of the vehicle(s) 104A, 104B from one or more of the weight sensors 106, weight data of the trailer 108 from the trailer weight sensor 110 coupled to the vehicle 104A, and/or user (e.g., driver) data from at least one of the key fob(s) 111A, 111B, the first wireless device 112, and/or the presence sensor 113. The vehicle data storer 204 may be implemented by a volatile memory (e.g., a Synchronous Dynamic Random Access Memory (SDRAM), Dynamic Random Access Memory (DRAM), RAIVIBUS Dynamic Random Access Memory (RDRAM), etc.) and/or a non-volatile memory (e.g., flash memory). The vehicle data storer 204 may additionally or alternatively be implemented by one or more double data rate (DDR) memories, such as DDR, DDR2, DDR3, mobile DDR (mDDR), etc. The vehicle data storer 204 may additionally or alternatively be implemented by one or more mass storage devices such as hard disk drive(s), compact disk drive(s), digital versatile disk drive(s), etc. While in the illustrated example the vehicle data storer 204 is illustrated as a single database, the vehicle data storer 204 may be implemented by any number and/or type(s) of databases. Further, the vehicle data storer 204 may be located in the vehicle(s) 104A, 104B or at a central location outside of the vehicle(s) 104A, 104B. For example, the vehicle data storer 204 can be located at the example central facility 122 of FIGS. 1A and 1B. Furthermore, the data stored in the vehicle data storer 204 may be in any data format such as, for example, binary data, comma delimited data, tab delimited data, structured query language (SQL) structures, etc.

The example load condition determiner 206, included in or otherwise implemented by the vehicle load condition manager 102, is capable of determining one or more loading conditions of the vehicle(s) 104A, 104B of FIG. 1 using received sensor values. In the illustrated example of FIG. 2, the load condition determiner 206 receives sensor values from at least one of the weight sensor(s) 106, the trailer weight sensor 110, the key fob(s) 111A, 111B, the first wireless device 112, and/or the presence sensor 113.

Utilizing the received sensor values (e.g., weight values from at least one of the weight sensor(s) 106 and/or the trailer weight sensor 110), the load condition determiner 206 determines (e.g., calculates) one or more loading conditions of the vehicle(s) 104A, 104B. The loading conditions can include at least load of a front axle of the vehicle(s) 104A, 104B, load of a rear axle of the vehicle(s) 104A, 104B, total load of the vehicle(s) 104A, 104B, load of the vehicle 104 and the trailer 108, total load of the trailer 108, tongue load of the trailer 108, etc.

In some examples, to calculate one or more loading conditions from the sensor values, the load condition determiner 206 can apply a correlation coefficient (e.g., a constant) to one or more of the sensor values, combine and/or subtract one or more sensor values from one or more other sensor values, or complete any other mathematical function required to derive the desired loading conditions from the received sensor values. For example, calculating the total load of the vehicle(s) 104A, 104B can be implemented by summing the weight value acquired from each of the weight sensors 106. In response to calculation of the desired loading conditions, the load condition determiner 206 is further to distribute the load to the example threshold comparator 212.

The example profile manager 208, included in or otherwise implemented by the vehicle load condition manager 102, manages one or more profiles of users of the vehicle(s) 104A, 104B. Managing the profiles of the users further includes at least one of generating and/or modifying a user profile based on an input received from the display 114. In some examples, fields of the user profiles to be generated and/or modified can include limits enforced on one or more loading conditions (e.g., load of front axle, load of rear axle, vehicle load, etc.).

For example, the profile can include a limit on the weight of the vehicle(s) 104A, 104B to a value such that an occupancy of the vehicle(s) 104A, 104B is limited to one (1). In other examples, the profile can be set to limit the weight of the vehicle(s) 104A, 104B to a value such that an occupancy of the vehicle(s) 104A, 104B is limited to zero (0) (e.g., theft deterrent). In yet other examples, the profile can be set to limit the weight of the trailer 108 to a towing capacity value of the vehicle 104A. Additionally, the profile can be set to limit any other loading condition and/or combination of loading conditions.

Additionally or alternatively, the profile can be set to include responses to exceeding the limits. An example interface for output on the display 114 interacting with the profile manager 208 is described further in conjunction with FIGS. 3A-3B.

The example profile storer 210, included in or otherwise implemented by the vehicle load condition manager 102, is capable of storing one or more user profiles (the profiles including at least one of load condition limits and responses to exceeding the limits) of potential users (e.g., drivers) of the vehicle(s) 104A, 104B. The profile storer 210 may be implemented by a volatile memory (e.g., a Synchronous Dynamic Random Access Memory (SDRAM), Dynamic Random Access Memory (DRAM), RAIVIBUS Dynamic Random Access Memory (RDRAM), etc.) and/or a non-volatile memory (e.g., flash memory). The profile storer 210 may additionally or alternatively be implemented by one or more double data rate (DDR) memories, such as DDR, DDR2, DDR3, mobile DDR (mDDR), etc. The profile storer 210 may additionally or alternatively be implemented by one or more mass storage devices such as hard disk drive(s), compact disk drive(s), digital versatile disk drive(s), etc. While in the illustrated example the profile storer 210 is illustrated as a single database, the profile storer 210 may be implemented by any number and/or type(s) of databases. Further, the profile storer 210 may be located in the vehicle(s) 104A, 104B or at a central location outside of the vehicle(s) 104A, 104B. For example, the profile storer 210 can be located at the example central facility 122 of FIGS. 1A and 1B. Furthermore, the data stored in the profile storer 210 may be in any data format such as, for example, binary data, comma delimited data, tab delimited data, structured query language (SQL) structures, etc.

The example threshold comparator 212, included in or otherwise implemented by the vehicle load condition manager 102, receives one or more loading conditions of the vehicle(s) 104A, 104B from the example load condition determiner 206 and an identity of the user of the vehicle(s) 104A, 104B from the sensor interface 202. Based on the identity of the user, the threshold comparator 212 queries the profile storer 210, the query to retrieve one or more loading condition limits (e.g., front axle load limited to 1,500 lbs., trailer load limited to 3,000 lbs., etc.) stored in the profile storer 210 for the identified user.

In response to completing the retrieval of one or more loading condition limits (e.g., threshold) for the identified user of the vehicle(s) 104A, 104B, the threshold comparator 212 compares the one or more loading conditions received from the load condition determiner 206 to respective ones of loading condition limits retrieved from the profile storer 210 for the identified user. The threshold comparator 212, in some examples, determines whether one or more loading conditions satisfies a corresponding threshold.

In some examples, the threshold is a lower limit and the loading condition satisfies the threshold when the loading condition is less than the threshold (e.g., a minimum weight of the vehicle(s) 104A, 104B is 2,500 lbs.; any load less than 2,500 lbs. satisfies the threshold). In other examples, the threshold is an upper limit and the loading condition satisfies the threshold when the loading condition is greater than the threshold (e.g., a maximum weight of the trailer 108 is 3,000 lbs.; any load greater than 3,000 lbs. satisfies the threshold. In response to determining one or more loading conditions satisfies the corresponding threshold, the threshold comparator 212 is further to distribute a notification to at least one of the vehicle feature modifier 214 and/or the alert propagater 216.

The example vehicle feature modifier 214, included in or otherwise implemented by the vehicle load condition manager 102, is capable of receiving a threshold satisfaction notification from the threshold comparator 212 and an identity of the user of the vehicle(s) 104A, 104B from the sensor interface 202. Based on the identity of the user, the vehicle feature modifier 214 queries the profile storer 210. In some examples, the query retrieves one or more responses to a load condition satisfying a threshold (e.g., disable the ignition of the vehicle 104A when a weight of the trailer 108 satisfies the threshold, etc.) stored in the profile storer 210 for the identified user for the one or more loading conditions which were determined to satisfy the corresponding threshold. In response to retrieving the one or more responses, the vehicle feature modifier 214 is further to propagate the one or more responses to the example performance controller 116 of FIG. 1 for application.

The example alert propagater 216, included in or otherwise implemented by the vehicle load condition manager 102, is capable of receiving the threshold satisfaction notification from the threshold comparator 212 and propagating the notification to at least one of the display 114 and/or the network 118, the network 118 to further propagate the notification to at least one of the second wireless device 120 and/or the central facility 122. In some examples, the alert propagater 216 modifies the notification received from the threshold comparator 212 to be in a format readable on at least one of the display 114 and/or the second wireless device 120.

While an example manner of implementing the vehicle load condition manager 102 of FIGS. 1A and 1B is illustrated in FIG. 2, one or more of the elements, processes and/or devices illustrated in FIG. 2 may be combined, divided, re-arranged, omitted, eliminated and/or implemented in any other way. Further, the example sensor interface 202, the example load condition determiner 206, the example profile manager 208, the example threshold comparator 212, the example vehicle feature modifier 214, the example alert propagater 216 and/or, more generally, the example vehicle load condition manager 102 of FIGS. 1A and 1B may be implemented by hardware, software, firmware and/or any combination of hardware, software and/or firmware. Thus, for example, any of the example sensor interface 202, the example load condition determiner 206, the example profile manager 208, the example threshold comparator 212, the example vehicle feature modifier 214, the example alert propagater 216 and/or, more generally, the example vehicle load condition manager 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 202, the example load condition determiner 206, the example profile manager 208, the example threshold comparator 212, the example vehicle feature modifier 214, and/or the example alert propagater 216 is/are hereby expressly defined to include a non-transitory computer readable storage device or storage disk such as a memory, a digital versatile disk (DVD), a compact disk (CD), a Blu-ray disk, etc. including the software and/or firmware. Further still, the example vehicle load condition manager 102 of FIG. 1A, 1B may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3A:
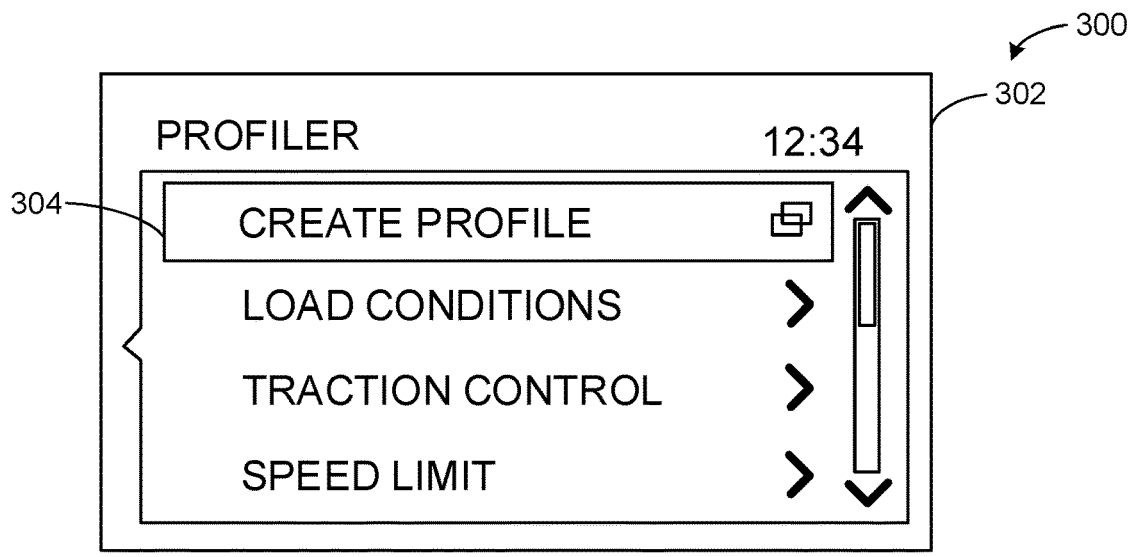
FIGS. 3A-3B are example interfaces by which a user can edit profiles utilized by the vehicle load condition manager and/or the vehicle load condition manager can display outputs of the vehicle load condition manager.
Figure 3A:
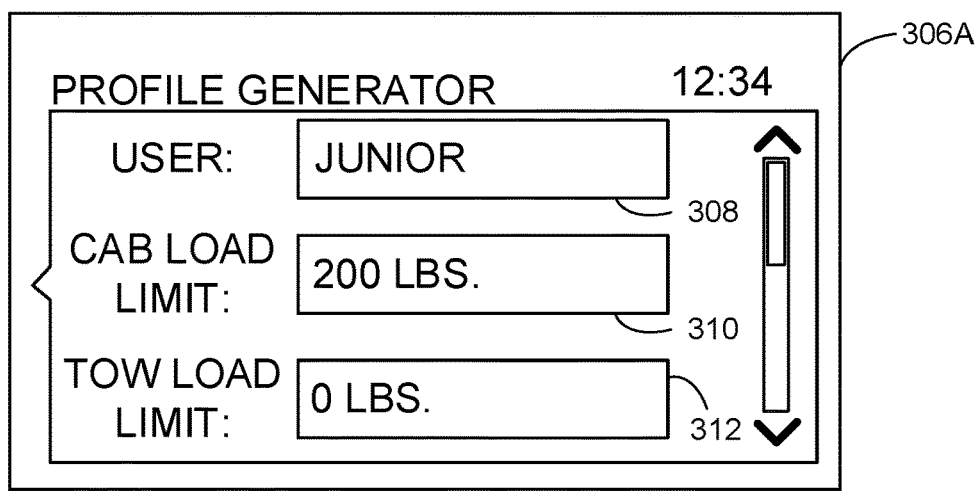
Figure 3A:
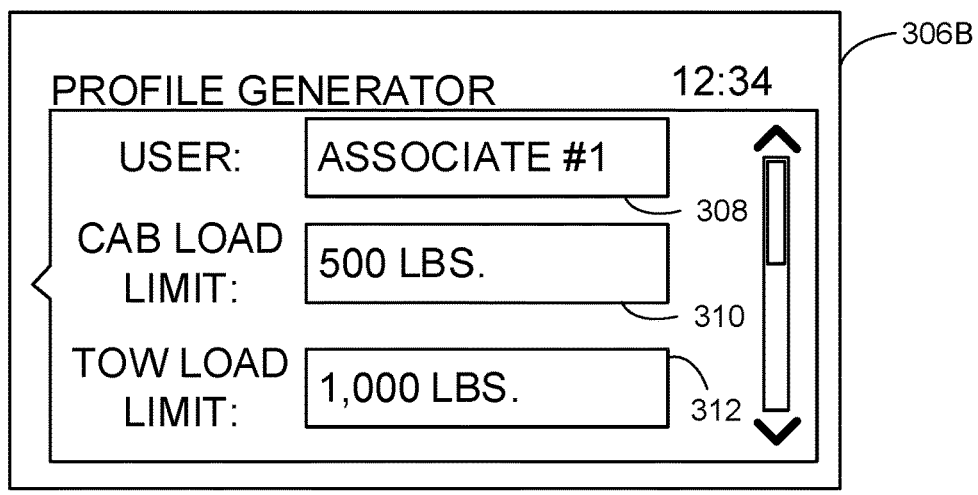
Figure 3B:
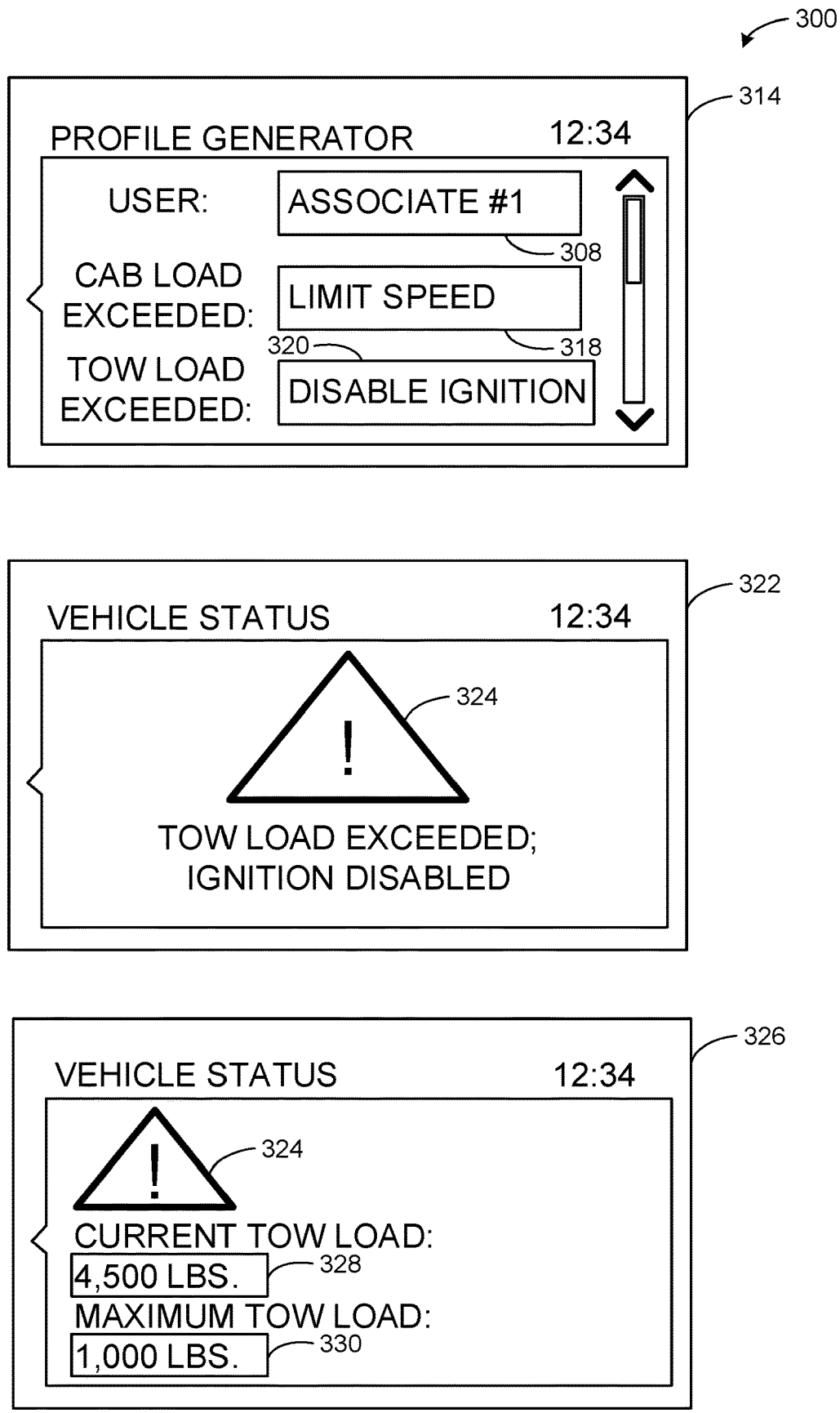

FIGS. 3A and 3B illustrate an example interface 300 that can be displayed by the display 114 included in the vehicle (s) 104A, 104B of FIGS. 1A and 1B. For example, a first screen 302 of the interface 300 allows a user (e.g., an owner and/or manager of the vehicle(s) 104A, 104B) to generate a profile for a user (e.g., a driver) of the vehicle(s) 104A, 104B by selecting a profile creation field 304. In response to selection of the profile creation field 304, the interface 300 navigates to one of a screen 306A or a screen 306B.

The screen 306A displays a user profile for the user "Junior," as denoted by a user field 308. The user "Junior," for example, can be a child of an owner of the vehicle(s) 104A, 104B. The screen 306A further allows for the entry of load condition limits such as a cab load limit entered into a first limit field 310, the cab load limit set to 200 lbs. (e.g., to prevent multiple occupants to simultaneously occupy the vehicle(s) 104A, 104B) and a tow load limit entered into a second limit field 312, the tow load limit set to 0 lbs. (e.g., to prevent "Junior" from being able to couple the trailer 108 to the vehicle 104A).

The screen 306B displays a user profile for the user "Associate #1," as denoted by the user field 308. The user "Associate #1," for example, can be a new hire of the manager of the vehicle(s) 104A, 104B. The screen 306B further allows for the entry of load condition limits such as a cab load limit entered into the first limit field 310, the cab load limit set to 500 lbs. and a tow load limit entered into the second limit field 312, the tow load limit set to 1,000 lbs. In some examples, each of the cab load limit value and the tow load limit value are set according to manufacturer specified limits. Additionally or alternatively, the limits may be less than manufacturer specified limits, the manager intending to raise the limits once "Associate #1" gains further experience.

A screen 314 displays additional detail about the user "Associate #1," as denoted by the user field 308. In some examples such as the illustrated example of FIG. 3B, the additional details include determined responses to loading conditions satisfying corresponding thresholds. For example, as entered into a first response field 318, the user profile for "Associate #1" is set to limit speed of the vehicle(s) 104A, 104B when the cab load is exceeded (e.g., per the field 310B, when the cab load is greater than 500 lbs. as illustrated in FIGS. 3A-3B). Additionally, as entered into a second response field 320, the user profile for "Associate #1" is set to disable the ignition of the vehicle(s) 104A, 104B when the tow load is exceeded (e.g., per the field 312B, when the tow load is greater than 1.00 lbs. as illustrated in FIGS. 3A-3B.)

A screen 322 displays a warning 324 for a user (e.g., a driver) of the vehicle(s) 104A, 104B via the display 114 in response to a loading condition satisfying the corresponding threshold. In the illustrated example of FIG. 3B, the loading condition satisfying the threshold is the tow load and, in response to the tow load exceeding the threshold, the ignition of the vehicle(s) 104A, 104B has been disabled.

In some examples, as illustrated in a screen 326, the warning 324 can further include a loading condition limit field 328 displaying the current value of the loading condition that satisfies the threshold and a loading condition limit field 330 displaying the threshold for the loading condition. In the illustrated example of FIG. 3B, the current tow load is 4,500 lbs. (loading condition limit field 328) and the maximum tow load is 1,000 lbs. (loading condition limit field 330). In some examples, the load displayed in loading condition field 328 updates dynamically and displays a substantially current value of the load, assisting (e.g., prompting) the user of the vehicle(s) 104A, 104B to reduce (or increase) the load to be compliant with the value in the loading condition limit field 330.

Figure 4:
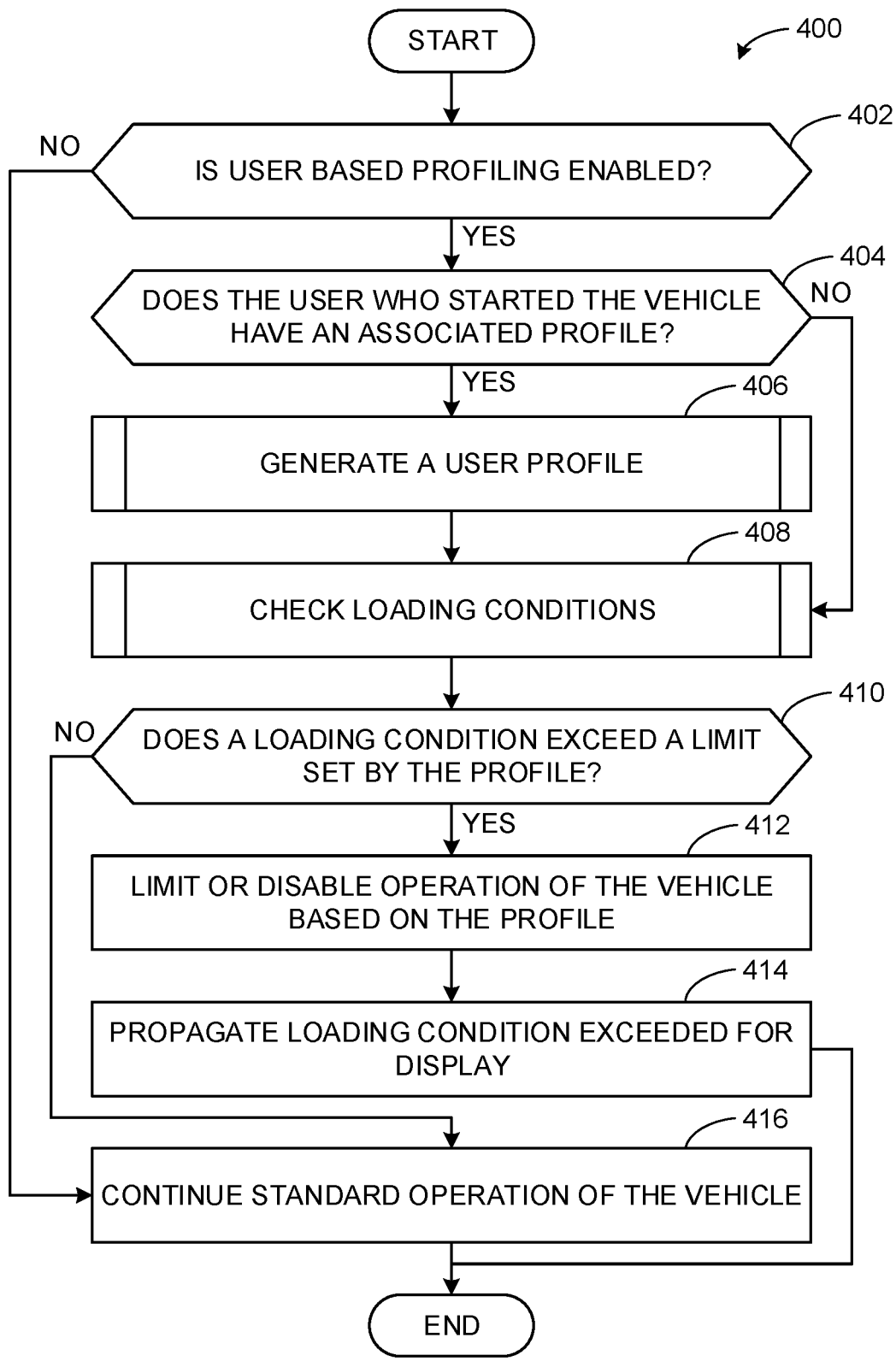
FIGS. 4-6 are flowcharts representative of example methods that may be performed using the vehicle load condition manager of FIGS. 1A, 1B, and/or 2 to modify a vehicle feature based upon a loading condition.
Figure 5:
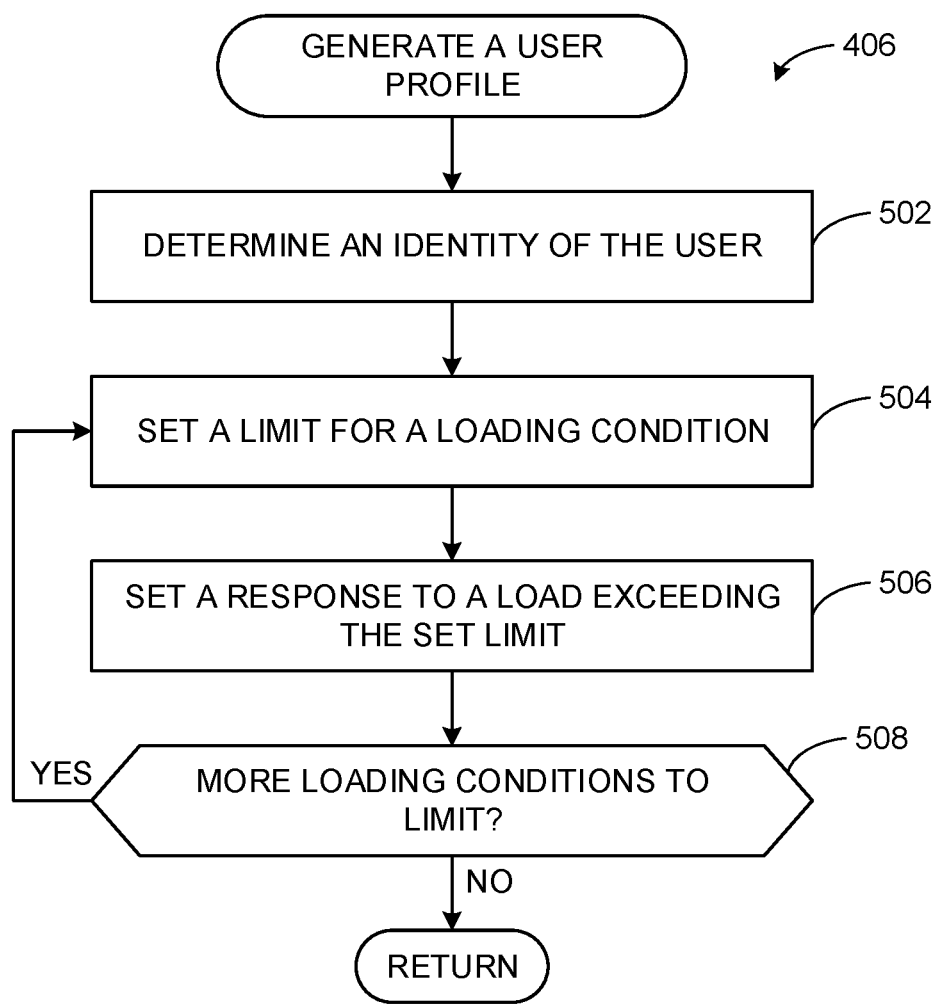
Figure 6:
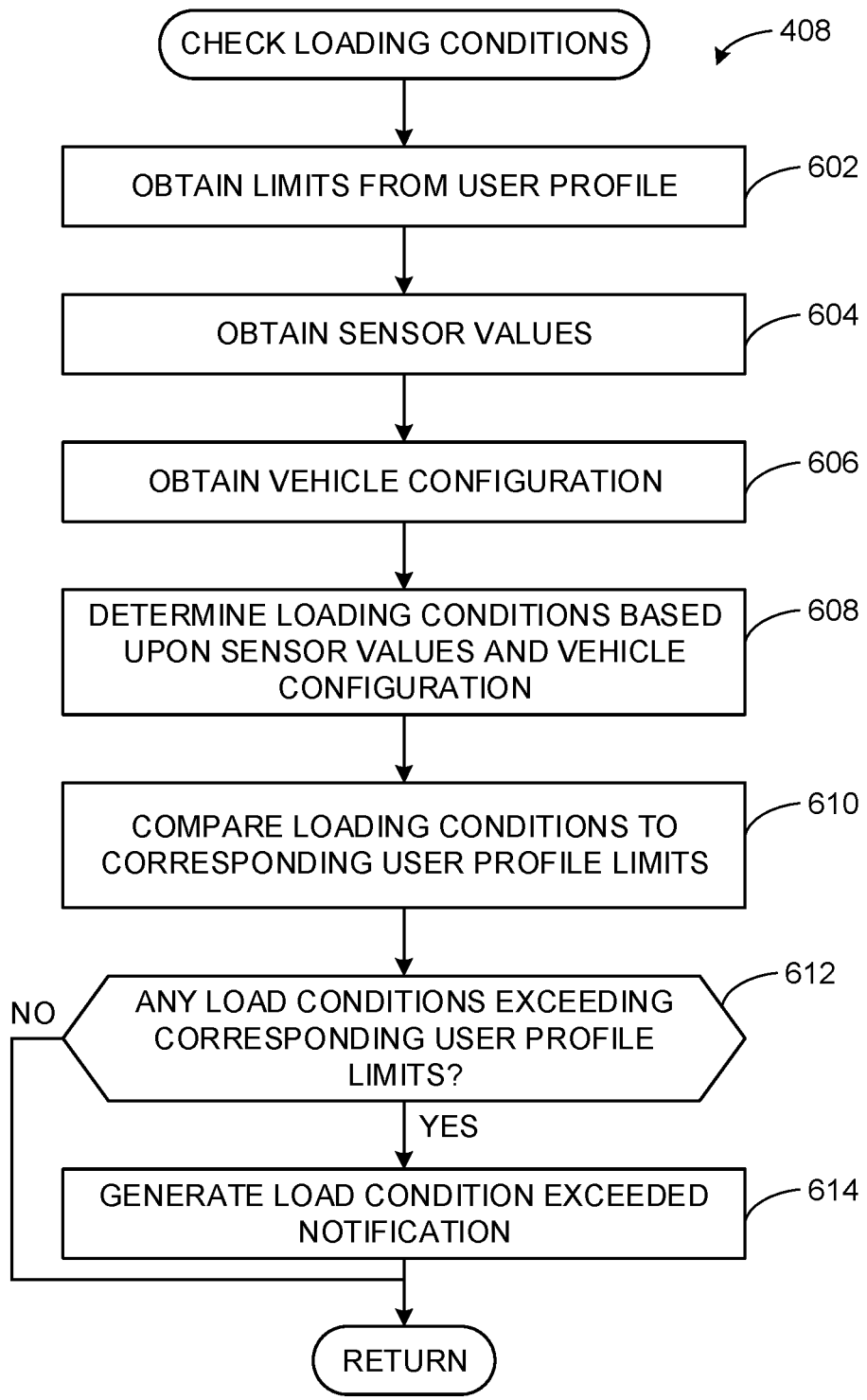

Flowcharts representative of example methods for implementing the vehicle load condition manager 102 of FIG. 2 are shown in FIGS. 4-6. In these examples, the method(s) may be implemented using machine readable instructions comprising a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 4-6, many other methods of implementing the example vehicle load condition manager 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The example method 400 of FIG. 4 begins at block 402. At block 402, the vehicle load condition manager 102 determines whether user based profiling is enabled. In response to determining that user based profiling is enabled, processing proceeds to block 404. Alternatively, in response to determining that user based profiling is not enabled, processing proceeds to block 416.

At block 404, the profile manager 208 determines whether the user of the vehicle(s) 104A, 104B (the user determined based on at least one of the key fob(s) 111A, 111B, the first wireless device 112, and/or the presence sensor 113) has a corresponding profile stored in the profile storer 210. In response to determining that a profile for the user is not available, processing proceeds to block 406. Alternatively, in response to determining that a profile for the user is available, processing proceeds to block 408.

At block 406, further described in conjunction with FIG. 5, the profile manager 208 is to obtain one or more inputs including one or more loading condition limits and one or more corresponding responses to a load condition exceeding the limit to generate a profile for the user. In response to the completion of the user profile, processing proceeds to block 408.

At block 408, further described in conjunction with FIG. 6, the load condition determiner 206 determines one or more loading conditions on the vehicle(s) 104A, 104B based on data received from one or more of the weight sensors 106 and/or the trailer weight sensor 110. Additionally, the threshold comparator 212 determines whether one or more of the loading conditions satisfy a threshold and generates a notification when one or more of the loading conditions does satisfy a corresponding threshold.

At block 410, the threshold comparator 212 determines whether one or more loading conditions exceed the corresponding threshold based on the notification generated at block 408. In response to determining a loading condition does exceed the corresponding threshold, processing proceeds to block 412. Conversely, in response to determining the load condition does not exceed the corresponding threshold, processing proceeds to block 416.

At block 412, in response to determining one or more loading conditions do(es) satisfy the corresponding threshold at block 410, the vehicle feature modifier 214 determines one or more features (e.g., operations, performance, etc.) of the vehicle(s) 104A, 104B to modify based on a user profile retrieved from the profile storer 210. For example, the vehicle feature modifier 214 can determine it is desired to at least one of limit a speed of the vehicle(s) 104A, 104B, disable an ignition of the vehicle(s) 104A, 104B, and/or prevent shifting of the vehicle(s) 104A, 104B into one or more gears (e.g., preventing shifting to gears greater than $3^{rd}$ gear, preventing shifting out of park, etc.). In some examples at block 412, the vehicle feature modifier 214 is further to distribute the determined feature modification to the performance controller 116 of FIG. 1.

At block 414, the alert propagater 216 propagates a loading condition exceeded notification to at least one of the display 114 or the second wireless device 120 via the network 118 for display. In some examples at block 414, the alert propagater 216 is further to format the notification for propagation. In response to completion of propagation of the loading condition exceeded notification, the processing of the example method 400 of FIG. 4 ends.

At block 416, in response to determining at least one of user based profiling is not enabled at block 402 and/or determining that no loading conditions satisfy a corresponding threshold at block 410, the vehicle load condition manager 102 determines that the vehicle(s) 104A, 104B are to continue standard operation and the example method 400 of FIG. 4 ends.

An example method that may be executed to generate a user profile (FIG. 4, block 406) utilizing the profile manager 208 is illustrated in FIG. 5. With reference to the preceding figures and associated descriptions, the example method of FIG. 5 begins execution at block 502 at which an identify of the user is input to the display 114 and is received by the profile manager 208. In some examples at block 502, the identity of the user is stored in the profile storer 210.

At block 504, in response to having identified a user of the vehicle(s) 104A, 104B, a limit for a loading condition is input to the display 114 and is received by the profile manager 208. At block 506, a response to the loading condition set at block 504 satisfying a threshold is input to the display 114 and is received by the profile manager 208. In some examples at block 504 and block 506, at least one of the loading condition and the response to the loading condition satisfying the threshold is stored in the profile storer 210 in association with the identity of the user stored at block 502.

At block 508, the profile manager 208 determines whether any loading conditions have not been processed. In response to determining one or more loading conditions have not been processed, processing returns to block 504. Conversely, in response to determining that all loading conditions have been processed, the example method of block 406 ends and processing returns to block 408 of the example method 400 of FIG. 4.

An example method that may be executed to check loading conditions of the vehicle(s) 104A, 104B (FIG. 4, block 408) utilizing the vehicle load condition manager 102 is illustrated in FIG. 6. With reference to the preceding figures and associated descriptions, the example method of FIG. 6 begins execution at blocks 602, 604, 606 at which the threshold comparator 212 retrieves one or more loading condition limits (e.g., thresholds) from the profile storer 210, the loading condition determiner 206 retrieves one or more sensor values from the weight sensors 106 and the trailer weight sensor 110 via the sensor interface 202, and the loading condition determiner 206 retrieves one or more vehicle configuration parameters (e.g., vehicle model, vehicle length, axle placement, etc.) from the vehicle data storer 204, respectively.

At block 608, the loading condition determiner 206 determines one or more loading conditions for the vehicle(s) 104A, 104B based on the sensor values obtained at block 604 and the vehicle configuration received at block 606. In response to the determination of all desired loading conditions, processing proceeds to block 610.

At block 610, the threshold comparator 212 determines whether one or more of the loading conditions calculated at block 608 satisfies (e.g., exceeds, not exceed, etc.) the corresponding limits (e.g., thresholds) obtained from the profile of the user of the vehicle(s) 104A, 104B at block 602 via a comparison. In response to completion of the comparison, processing proceeds to block 612.

At block 612, in response to the threshold comparator 212 determining one or more loading conditions satisfy the corresponding threshold, processing proceeds to block 614. Conversely, in response to the threshold comparator 212 determining none of the loading conditions satisfy the corresponding threshold, the example method of block 408 ends and processing returns to block 410 of the example method 400 of FIG. 4.

At block 614, the threshold comparator 212 is further to generate a notification including an alert that one or more loading conditions satisfy a threshold and, in some examples, further include which loading conditions (e.g., front axle weight, rear axle weight, total load, etc.) exceed respective thresholds. In response to completing the generation of the notification, the example method of block 408 ends and processing returns to block 410 of the example method 400 of FIG. 4.

Figure 7:
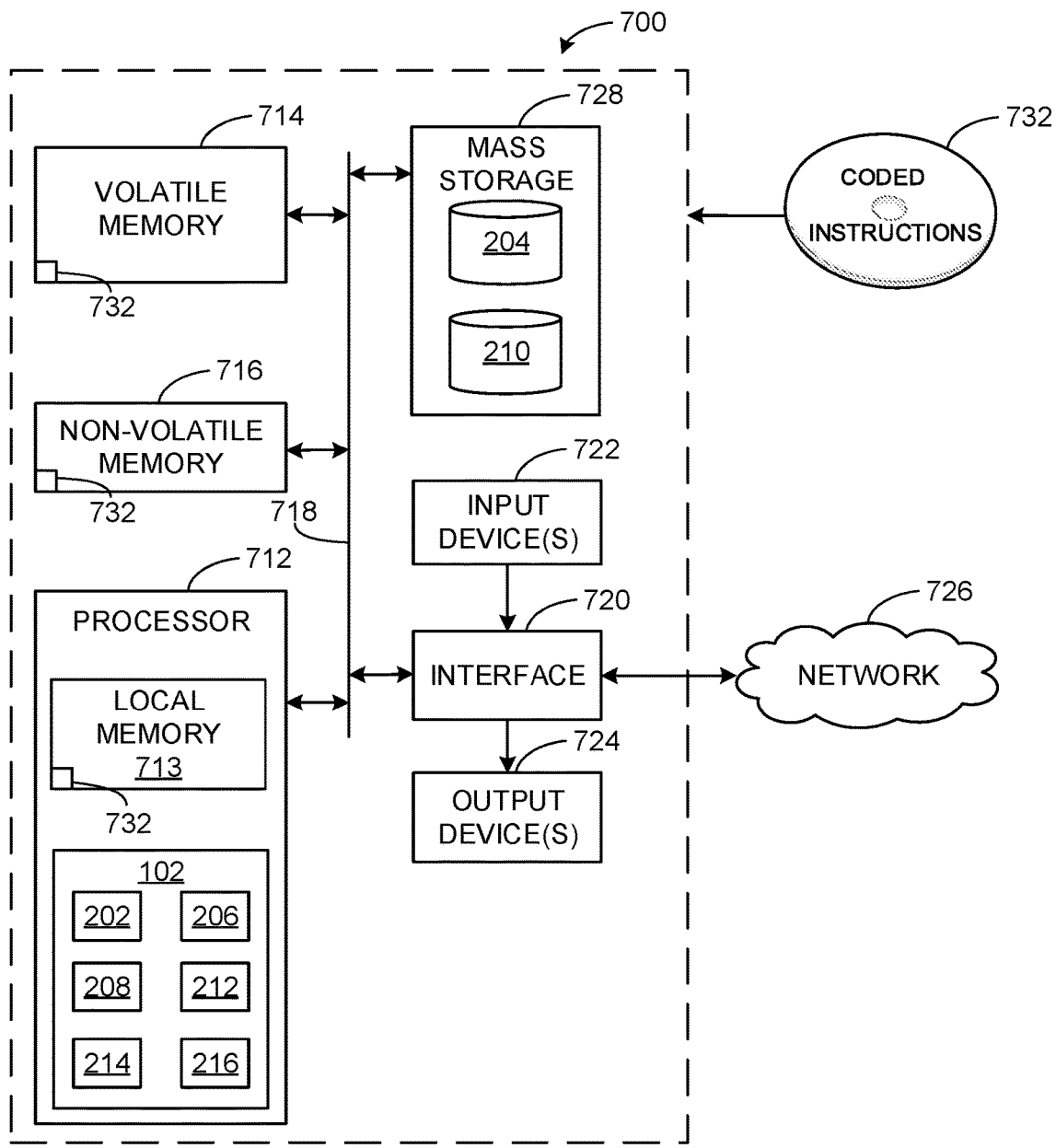
FIG. 7 is a block diagram of an example processing platform structured to execute machine readable instructions to implement the methods of FIGS. 4-6 and the example vehicle load condition manager of FIGS. 1A, 1B, and/or 2.

FIG. 7 is a block diagram of an example processor platform 700 structured to execute the instructions of FIGS. 4-6 to implement the vehicle load condition manager 102 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 implements the example sensor interface 202, the example load condition determiner 206, the example profile manager 208, the example threshold comparator 212, the example vehicle feature modifier 214, and the example alert propagater 216.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device (s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In this example, the mass storage devices 728 implement at least the example vehicle data storer 204 and the example profile storer 210.

The machine executable instructions 732 of FIGS. 4-6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that limit the function of a vehicle based on a loading condition imparted on the vehicle satisfying a threshold. In some examples, the threshold is user (e.g., driver) specific and can be modified via an interface for one or more drivers of the vehicle. Ensuring that loading conditions of vehicles never exceed safe maxima can facilitate an increase in the longevity and/or reliability of vehicles.

Example 1 includes an apparatus comprising a load condition determiner to calculate a load condition of a vehicle based on a sensor value, a threshold comparator to determine whether the load condition on the vehicle satisfies a threshold, the threshold based upon a profile of a user of the vehicle, and a vehicle feature modifier to modify a feature of the vehicle when the load condition satisfies the threshold, the feature modified based upon the profile.

Example 2 includes the apparatus of example 1, further including an alert propagater to propagate an alert to at least one of a display, a central facility, or a wireless device via a network when the load condition satisfies the threshold.

Example 3 includes the apparatus of example 2, wherein the display is further to prompt the user to modify the load condition to be compliant with the threshold.

Example 4 includes the apparatus of example 1, wherein an identity of the user is based upon an identifier associated with at least one of a vehicle key fob or a wireless device proximate the vehicle, or a sensor input identifying the user.

Example 5 includes the apparatus of example 1, wherein the vehicle feature modifier is to modify the feature of the vehicle by at least one of disabling an ignition of the vehicle, preventing the vehicle from traveling faster than a specified speed, or preventing the vehicle from being shifted out of park.

Example 6 includes the apparatus of example 1, wherein the profile is a first profile, the user is a first user, the threshold is a first threshold, the feature is a first feature, and a second user is to operate the vehicle the threshold comparator is further to determine whether the load condition of the vehicle satisfies a second threshold, the second threshold based upon a second profile of the second user, and the vehicle feature modifier is further to modify a second feature of the vehicle when the load condition satisfies the second threshold, the second feature modified based upon the second profile of the second user.

Example 7 includes the apparatus of example 6, further including a profile manager to modify at least one of the first threshold or the first feature associated with the first profile or the second threshold or the second feature associated with the second profile based on an input.

Example 8 includes an apparatus comprising a vehicle load condition manager programmed to modify a feature of a vehicle when a load condition of the vehicle satisfies a threshold, wherein at least one of the feature or the threshold is based upon a profile of a user of the vehicle.

Example 9 includes the apparatus of example 8, wherein the vehicle load condition manager is further programmed to propagate an alert to at least one of a display, a central facility, or a wireless device via a network when the load condition satisfies the threshold.

Example 10 includes the apparatus of example 9, wherein the display is further to prompt the user to modify the load condition to be compliant with the threshold.

Example 11 includes the apparatus of example 8, wherein the vehicle load condition manager is further programmed to identify the user operating the vehicle based upon an identifier associated with at least one of a vehicle key fob or a wireless device proximate the vehicle, or a sensor input identifying the user.

Example 12 includes the apparatus of example 8, wherein the vehicle load condition manager is further programmed to modify the feature of the vehicle by at least one of disabling an ignition of the vehicle, preventing the vehicle from traveling faster than a specified speed, or preventing the vehicle from being shifted out of park.

Example 13 includes the apparatus of example 8, wherein the profile is a first profile, the user is a first user, the threshold is a first threshold, the feature is a first feature, and a second user is to operate the vehicle the vehicle load condition manager is further programmed to modify a second feature of the vehicle when the load condition of the vehicle satisfies a second threshold, wherein at least of the second feature or the second threshold is based upon a second profile of the second user.

Example 14 includes the apparatus of example 13, wherein the vehicle load condition manager is further programmed to modify at least one of the first threshold or the first feature associated with the first profile or the second threshold or the second feature associated with the second profile based on an input.

Example 15 includes a method comprising calculating a load condition of a vehicle based on a sensor value, determining whether the load condition on the vehicle satisfies a threshold, the threshold based upon a profile of a user of the vehicle, and in response to the load condition satisfying the threshold, modifying a feature of the vehicle, the feature modified based upon the profile.

Example 16 includes the method of example 15, further including propagating an alert to at least one of a display, a central facility, or a wireless device via a network in response to the load condition satisfying the threshold.

Example 17 includes the method of example 15, wherein an identity of the user is based upon an identifier associated with at least one of a vehicle key fob or a wireless device proximate the vehicle, or a sensor input identifying the user.

Example 18 includes the method of example 15, wherein modifying the feature of the vehicle includes at least one of disabling an ignition of the vehicle, preventing the vehicle from traveling faster than a specified speed, or preventing the vehicle from being shifted out of park.

Example 19 includes the method of example 15, wherein the profile is a first profile, the user is a first user, the threshold is a first threshold, the feature is a first feature, and a second user is to operate the vehicle determining whether the load condition on the vehicle satisfies a second threshold, the second threshold based upon a second profile of the second user operating the vehicle, and modifying a second feature of the vehicle when the load condition satisfies the second threshold, the second feature modified based upon the second profile of the second user operating the vehicle.

Example 20 includes the method of example 19, further including modifying at least one of the first threshold or the first feature associated with the first profile or the second threshold or the second feature associated with the second profile based on an input.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a load condition determiner to calculate a load condition of a vehicle based on a sensor value;
    a threshold comparator to determine whether the load condition on the vehicle satisfies a threshold, the threshold based upon a profile of a user of the vehicle, the profile obtained from memory based on the user being proximate to the vehicle; and
    a vehicle feature modifier to modify a feature of the vehicle when the load condition satisfies the threshold to limit or disable operation of the vehicle, the feature modified based upon the profile, the load condition determiner, the threshold comparator, and the vehicle feature modifier implemented by one or more logic circuits.

2. The apparatus of claim 1, further including an alert propagater to propagate an alert to at least one of a display, a central facility, or a wireless device via a network when the load condition satisfies the threshold.

3. The apparatus of claim 2, wherein the display is further to prompt the user to modify the load condition to be compliant with the threshold.

4. The apparatus of claim 1, wherein an identity of the user is based upon:
    an identifier associated with at least one of a vehicle key fob or a wireless device proximate the vehicle; or
    a sensor input identifying the user.

5. The apparatus of claim 1, wherein the vehicle feature modifier is to modify the feature of the vehicle by at least one of disabling an ignition of the vehicle, preventing the vehicle from traveling faster than a specified speed, or preventing the vehicle from being shifted out of park.

6. The apparatus of claim 1, wherein the profile is a first profile, the user is a first user, the threshold is a first threshold, the feature is a first feature, and a second user is to operate the vehicle:
    the threshold comparator is further to determine whether the load condition of the vehicle satisfies a second threshold, the second threshold based upon a second profile of the second user; and
    the vehicle feature modifier is further to modify a second feature of the vehicle when the load condition satisfies the second threshold, the second feature modified based upon the second profile of the second user.

7. The apparatus of claim 6, further including a profile manager to modify at least one of the first threshold or the first feature associated with the first profile or the second threshold or the second feature associated with the second profile based on an input.

8. An apparatus comprising:
    a vehicle load condition manager programmed to modify a feature of a vehicle when a load condition of the vehicle satisfies a threshold to limit or disable operation of the vehicle, wherein at least one of the feature or the threshold is based upon a profile of a user of the vehicle, the profile obtained from memory based on the user being proximate to the vehicle, the vehicle load condition manager implemented by a logic circuit.

9. The apparatus of claim 8, wherein the vehicle load condition manager is further programmed to propagate an alert to at least one of a display, a central facility, or a wireless device via a network when the load condition satisfies the threshold.

10. The apparatus of claim 9, wherein the display is further to prompt the user to modify the load condition to be compliant with the threshold.

11. The apparatus of claim 8, wherein the vehicle load condition manager is further programmed to identify the user operating the vehicle based upon:
    an identifier associated with at least one of a vehicle key fob or a wireless device proximate the vehicle; or
    a sensor input identifying the user.

12. The apparatus of claim 8, wherein the vehicle load condition manager is further programmed to modify the feature of the vehicle by at least one of disabling an ignition of the vehicle, preventing the vehicle from traveling faster than a specified speed, or preventing the vehicle from being shifted out of park.

13. The apparatus of claim 8, wherein the profile is a first profile, the user is a first user, the threshold is a first threshold, the feature is a first feature, and a second user is to operate the vehicle:
    the vehicle load condition manager is further programmed to modify a second feature of the vehicle when the load condition of the vehicle satisfies a second threshold, wherein at least of the second feature or the second threshold is based upon a second profile of the second user.

14. The apparatus of claim 13, wherein the vehicle load condition manager is further programmed to modify at least one of the first threshold or the first feature associated with the first profile or the second threshold or the second feature associated with the second profile based on an input.

15. A method comprising:
    calculating a load condition of a vehicle based on a sensor value;
    determining whether the load condition on the vehicle satisfies a threshold, the threshold based upon a profile of a user of the vehicle, the profile obtained from memory based on the user being proximate to the vehicle; and
    in response to the load condition satisfying the threshold, modifying a feature of the vehicle to limit or disable operation of the vehicle, the feature modified based upon the profile.

16. The method of claim 15, further including propagating an alert to at least one of a display, a central facility, or a wireless device via a network in response to the load condition satisfying the threshold.

17. The method of claim 15, wherein an identity of the user is based upon:
    an identifier associated with at least one of a vehicle key fob or a wireless device proximate the vehicle; or
    a sensor input identifying the user.

18. The method of claim 15, wherein modifying the feature of the vehicle includes at least one of disabling an ignition of the vehicle, preventing the vehicle from traveling faster than a specified speed, or preventing the vehicle from being shifted out of park.

19. The method of claim 15, wherein the profile is a first profile, the user is a first user, the threshold is a first threshold, the feature is a first feature, and a second user is to operate the vehicle:
    determining whether the load condition on the vehicle satisfies a second threshold, the second threshold based upon a second profile of the second user operating the vehicle; and modifying a second feature of the vehicle when the load condition satisfies the second threshold, the second feature modified based upon the second profile of the second user operating the vehicle.

20. The method of claim 19, further including modifying at least one of the first threshold or the first feature associated with the first profile or the second threshold or the second feature associated with the second profile based on an input.

* * * * *